United States Patent
Russell, Jr. et al.

[11] Patent Number: 6,002,421
[45] Date of Patent: Dec. 14, 1999

[54] SYSTEM FOR MEASURING FAST SCAN ERROR OF RASTER SCANNERS

[75] Inventors: Melvin J. Russell, Jr., Rochester; Kenneth R. Ossman, Macedan, both of N.Y.

[73] Assignee: Xerox Corporation, Stamford, Conn.

[21] Appl. No.: 08/893,645

[22] Filed: Jul. 11, 1997

[51] Int. Cl.$^6$ ........................................ H04N 1/047
[52] U.S. Cl. .................. 347/250; 347/248; 347/259; 347/261; 358/483
[58] Field of Search ........................ 347/234, 235, 347/248, 250, 259, 261; 250/235, 236; 358/481, 482, 483

[56] References Cited

U.S. PATENT DOCUMENTS

| | | | |
|---|---|---|---|
| 4,620,237 | 10/1986 | Triano et al. | 358/300 |
| 4,884,083 | 11/1989 | Loce et al. | 347/259 |
| 4,978,949 | 12/1990 | Goddard et al. | 347/235 |
| 5,359,434 | 10/1994 | Nakao et al. | 358/481 |
| 5,363,126 | 11/1994 | Andrews | 347/134 |

*Primary Examiner*—N. Le
*Assistant Examiner*—Hai C. Pham
*Attorney, Agent, or Firm*—Diana Cox

[57] ABSTRACT

A fast scan error measuring system of a raster output scanner (ROS) is provided in order to determine whether the laser beam position in the fast scan direction is within acceptable operational parameters. A detector, for example, a linescan or area array camera, is used to acquire multiple successive images from each facet of the ROS as the unit is operating. For each rotating facet the position of a beam spot (centroid) at the end of scan line is measured. A sufficient number of centroids are collected so that a Fourier transform of the centroids will produce an accurate spatial frequency spectrum measured in cycles per millimeter. This spectrum can be easily compared to the product's fast scan error specification limits.

20 Claims, 3 Drawing Sheets

SYSTEM FOR MEASURING FAST SCAN ERROR OF RASTER SCANNERS

This invention relates generally a raster scanner and more particularly concerns a method and apparatus for measuring the pixel registration error in the fast scan direction of a raster scanner.

Pixel registration errors in raster output scanners (ROS's) require detection and quantification during manufacturing of the scanner. Such errors when in the fast scan direction of the ROS are usually indicative of an underlying fault or marginal failure in the scanner with the result of copy quality degradation. The usual scanner failures which are evidenced by fast scan error include velocity variations in the scanner scanning element, scratched or dirty optical elements, facet angle fabrication errors and misalignment of optical components. An accurate and easy method to detect and quantify fast scan error is highly desirable and would allow such scanner failures to be more readily detected, identified, and corrected while the scanner is being manufactured.

The following disclosures may be relevant to various aspects of the present invention:

U.S. Pat. No. 4,620,237
   Inventor: Traino et al.
   Issued: Oct. 28, 1986

U.S. Pat. No. 4,884,083
   Inventor: Loce et al.
   Issued: Nov. 28, 1989

U.S. Pat. No. 5,363,126
   Inventor: Andrews
   Issued: Nov. 8, 1994

U.S. Pat. No. 5,371,608
   Inventor: Muto et al.
   Issued Dec. 6, 1994

Some relevant portions of the foregoing disclosures may be briefly summarized as follows:

U.S. Pat. No. 4,620,237 discloses a system for detecting and measuring fast scan jitter. Two photosensors are combined in a unitary detector positionable in the path of a scanning beam, the two photosensors outputting signal pulses representing the intensity of the scanning beam which has been modulated by test pixels. A differential integrator integrates the signal pulse outputs of the photosensors to provide a test signal for each line scanned. A peak to peak detector compares the test signal of one scan line with the test signal from the succeeding scan lines to provide a jitter signal where the test signals are different. A meter is used for converting the jitter signal to a visual readout.

U.S. Pat. No. 4,884,083 teaches a raster output scanning device which compensates for the effects of motion of the medium upon which an image is being printed. An amplitude transmittance spatial filter is positioned either in an exit pupil of the slow scan optics of the system or in the first Fourier transform plane of a lens positioned between the scanning device and the recording medium. Several preferred transmittance functions are discussed.

U.S. Pat. No. 5,363,126 is drawn to an optical element for laser beam deflection in a raster output scanner of an electrophotographic printer. The optical element includes a chamber containing a ferroelectric liquid crystal material having a variable index of refraction as a function of voltage applied thereacross. The ROS includes a control system coupled to a voltage source for applying a voltage across the optical element to control the variable index thereof in conjunction with the rotation of the polygon, facet alignment errors and/or belt motion errors to provide high speed tracking of a light beam.

U.S. Pat. No. 5,371,608 discloses a scan optical apparatus with a first light source for generating an optically modulated beam based on an image signal and a second light source for generating a beam for jitter amount detection. A scanning device deflects the beams from the first and second light source to scan a surface with an optical member disposed nearby. A detecting device detects the beam reflected by the optical member and deflected by the scanning device. The optical member may have reflective portions and nonreflective portions which are repeatedly arranged in a main scan direction. This system is used to measure the amount of jitter generated in the ROS.

All of the above references are hereby incorporated by reference.

SUMMARY OF THE INVENTION

A first aspect of the invention is drawn to an apparatus for measuring fast scan error of a scanning beam of a raster output scanner, using a laser source which forms a laser beam. A light modulator modulates the laser beam and a light reflecting element formed of facets rotates to form a scan line with a start of scan line position and an end of scan line position. A detector records the position of the reflected laser beam, the light reflecting element and modulated laser beam forming a single beam spot on the detector and controls for the operation of the detector so that the detector records the position of the single beam spot. A computer calculates the Fourier transform of a plurality of beam spot positions to produce a frequency spectrum of the raster output scanner expressed in cycles per a measurement of distance.

Another aspect of the invention is drawn to a method for measuring fast scan error of a scanning beam of a raster output by forming a laser beam with a laser source and modulating the laser beam with a light modulator. The modulated laser beam is reflected with a light reflecting element formed of facets which rotates, each rotating facet reflecting the modulated laser beam to form a scan line with a start of scan line position and an end of scan line position. The position of the reflected laser beam is detected, the light reflecting element and modulated laser beam forming a single beam spot on the detector. The operation of the detector is controlled so that the detector records the position of the single beam spot and the Fourier transform of a plurality of beam spot positions is calculated to produce a frequency spectrum of the raster output scanner expressed in cycles per a measurement of distance, Yet another aspect of the invention is drawn to a method for measuring fast scan error of a scanning beam of a raster output scanner by forming a laser beam with a laser source and modulating the laser beam with a light modulator. The modulated laser beam is reflected with a light reflecting element formed of facets which rotates, each rotating facet reflecting the modulated laser beam to form a scan line with a start of scan line position and an end of scan line position, the position of the start of scan position being fixed. The position of the reflected laser beam is detected, the light reflecting element and modulated laser beam forming a single beam spot on the detector; The operation of the detector is controlled by triggering the detector control with the start of scan signal so that the detector records the position of the single beam spot and the Fourier transform of a plurality of beam spot positions is calculated to produce a frequency spectrum of the raster output scanner expressed in cycles per a measurement of distance.

A fast scan error measuring system of a raster output scanner (ROS) is provided in order to determine whether the laser beam position in the fast scan direction is within acceptable operational limits. A detector, for example, a linescan or area array camera, is used to acquire multiple successive images from each facet of the ROS as the unit is operating. For each rotating facet the position of a beam spot (centroid) at the end of scan line is measured. A sufficient number of centroids are collected so that a Fourier transform of the centroids will produce an accurate spatial frequency spectrum measured in cycles per millimeter. This spectrum can be easily compared to the product's fast scan error specification limits.

BRIEF DESCRIPTION OF THE DRAWINGS

Other features of the present invention will become apparent as the following description proceeds and upon reference to the drawings, in which.

DETAILED DESCRIPTION OF THE INVENTION

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

Figure 1:
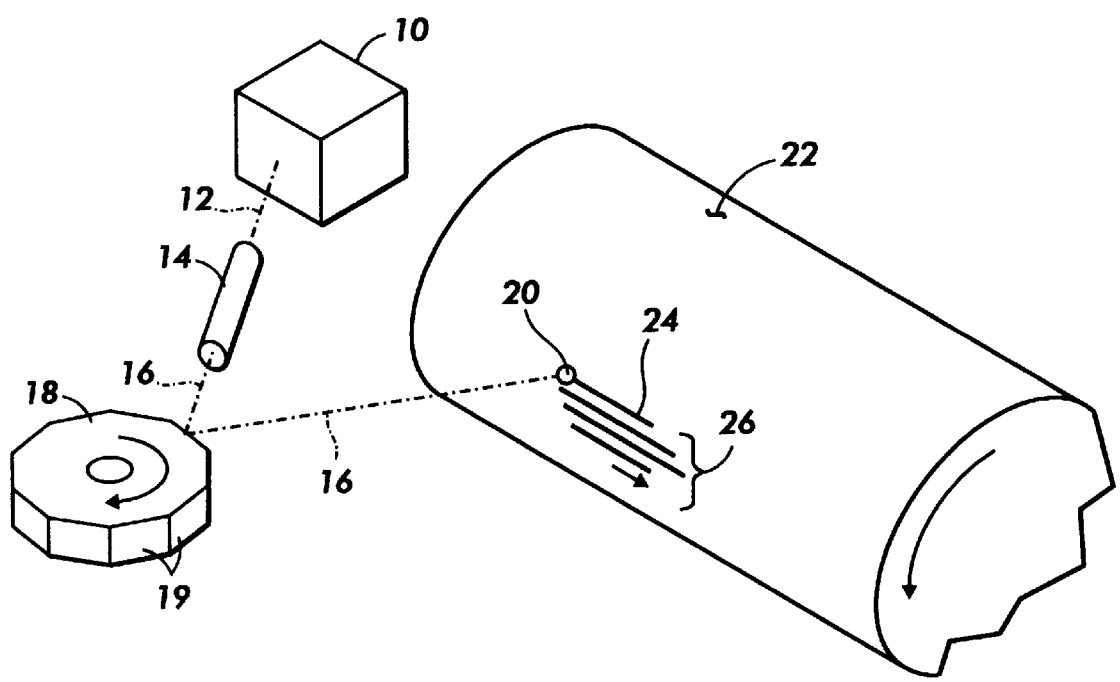
FIG. 1 is a schematic view showing the basic elements of a raster output scanner.

Referring to FIG. 1 of the drawings, there is shown an exemplary scanning system. A suitable source of high intensity light such as laser 10 produces a collimated laser beam 12. Image signal source 14 may comprise any suitable source of image signals, such as a communication channel, memory, raster input scanner, etc. and modulates the laser beam 12. Modulated laser beam 16 is directed to a light reflecting element 18, shown here in the form of a polygon. Each facet 19 of light reflecting element 18 in turn deflects modulated laser beam 16 to create an illuminated beam spot 20 on the pre-charged surface of photoreceptor 22. The system may include additional optical elements such as focusing lenses (not shown). The energy of the beam spot 20 on a particular location on the surface of photoreceptor 22 corresponds to a picture element (pixel) in the desired image and discharges the surface.

When beam spot 20 is caused by the rotation of light reflecting element 18 to move across photoreceptor 22, a scan line 24 of selectively discharged areas results on photoreceptor 22. Each scan line has a start of scan (SOS) and end of scan (EOS) position. The surface of photoreceptor 22 moves in a process or slow scan direction as indicated by the arrow. The motion of beam spot 20 through each scan line 24 is transverse to the process direction and is known as the fast scan direction. The periodic scanning of beam spot 20 across the moving photoreceptor 22 creates an array of scan lines 24 called a raster 26, forming the desired image to be printed.

The latent electrostatic image created on photoreceptor 22 by the laser beam 16 is developed at a developing station (not shown), the developed image being transferred to a suitable copy substrate such as a copy sheet at a transfer station (not shown). The copy sheet is thereafter fused or fixed at a fusing station (not shown) and the finished copy discharged into an output device such as a sorter (not shown). Following transfer of the developed image, photoreceptor 22 is cleaned at a cleaning station (not shown) and uniformly charged at a charging station (not shown) in preparation for imaging.

In order to assure desired copy quality and prevent image blur or distortion, each pixel in each succeeding image line must be positioned at the same point on photoreceptor 22. An error in the position or placement of a pixel along the scan line in the fast scan direction is referred to herein as fast scan error. Excessive fast scan error is indicative of marginal failures in a scanner such as velocity variations in the rotational speed of reflecting element 18, scratched or dirty or fabrication errors or misaligned optical elements, etc. As will appear, the fast scan error measuring system of the present invention facilitates detection of fast scan error and consequent detection and identification of the failure in the scanner.

Figure 2:
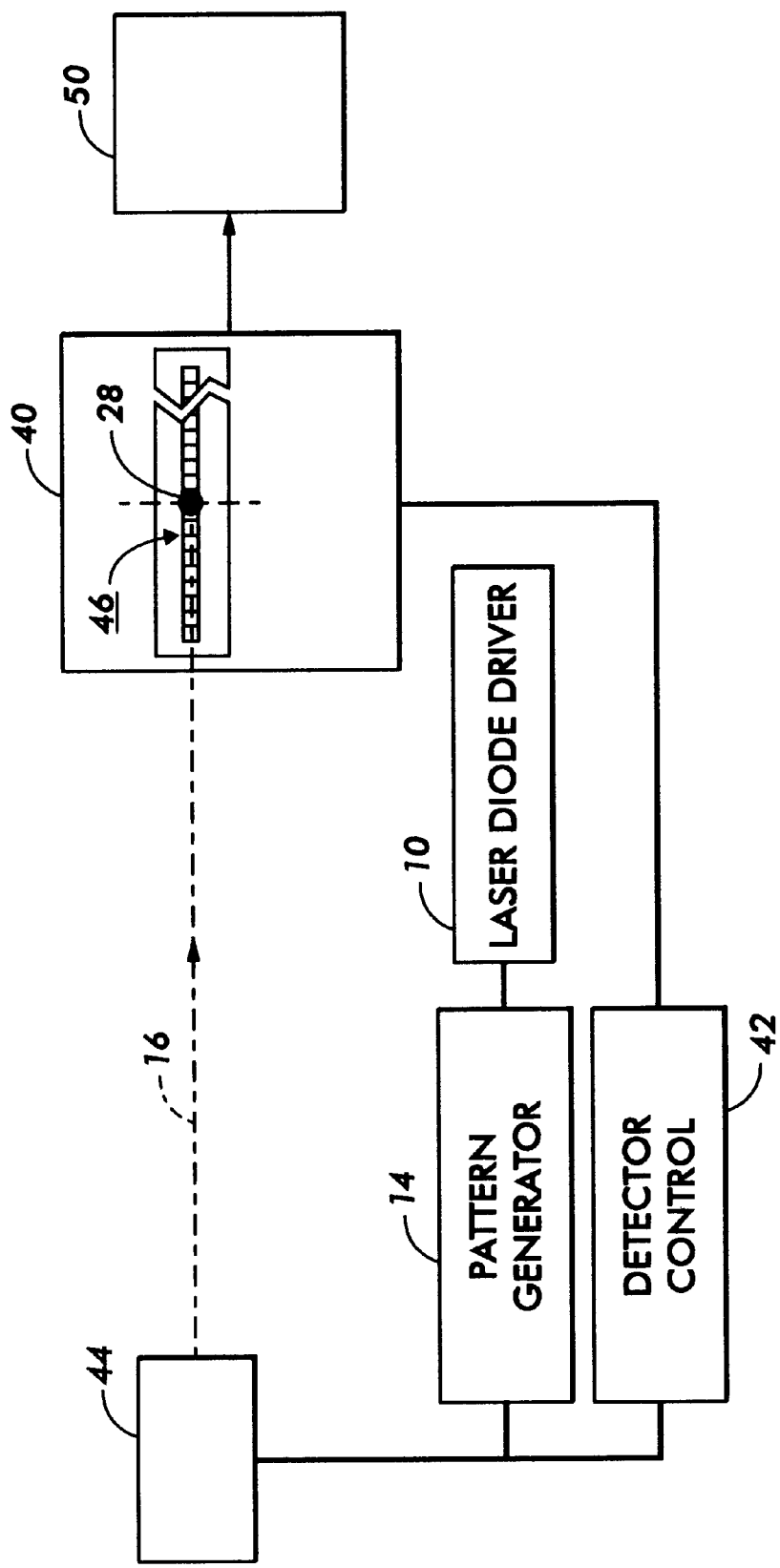
FIG. 2 is a schematic view of the present invention using a line scan camera.

Referring to FIG. 2, a fast scan error measuring system of the present invention is shown. Detector 40, which can be any device capable of detecting the position or laser 16 with an accurracy of 1 micron or less, preferably in the form of a camera or charge coupled device (CCD), is aligned with the ROS output scan line along which modulated laser 16 travels. Image signal source 14 produces a test pattern to modulate laser 12 to form modulated laser 16 so that only one spot of light will be formed on detector 40. In the embodiment shown, a linescan camera 46 is positioned at the EOS where EOS beam spot 28 is formed. Image signal source 14 and detector control 42 are triggered by the ROS's SOS signal so that the data and sample times are synchronized with the rotation of each facet.

Once linescan camera 46 captures the beam spot position data, the centroid of the spot can be calculated. After the centroid data is gathered from a number of consecutive scan lines sufficient for statistical purposes, for example 1024 lines, the data is processed by computer 50. Computer 50 calculates the Fourier transform of the centroids to produce a frequency spectrum expressed in cycles per millimeter. The lower frequencies in the frequency spectrum indicate Hunting error due to defects in the electronic speed control. The higher frequencies in the frequency spectrum indicate fast scan error due to optical defects in the light reflecting element, such as a polygon, the peak amplitude of the frequency spectrum indicating the fast scan error commonly known as jitter. This peak amplitude can easily be compared to the product jitter specification limits in order to determine whether the optical system of the ROS is properly manufactured.

Figure 3:
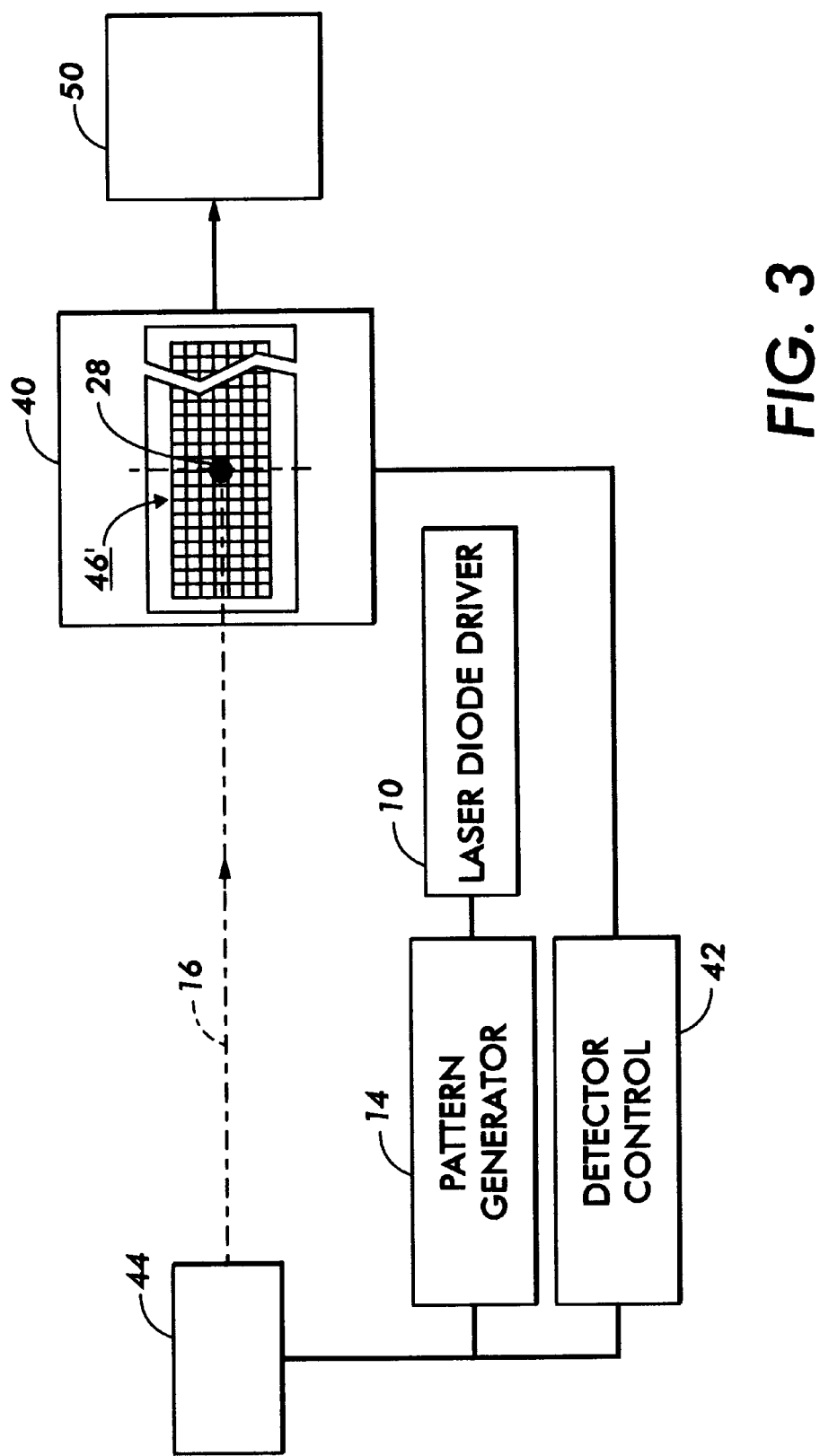
FIG. 3 is a schematic view of the present invention using an area array camera.

FIG. 3 shows a fast scan error measuring system as described above, however in this embodiment, detector 40 is an area array such as an area array camera or CCD 46'. Having detector 40 in the form of an area array solves the problem of the linescan camera array of FIG. 2, the width of line scan camera 46 being very small (approximately 13 microns), compared to the position tolerance of the laser beam in the ROS assembly (approximately 3 millimeters). A two dimensional camera array can cover the entire range of expected beam positions, resulting in easy detection of beam spot 28, again preferably positioned at the EOS position. Area array 46' must be fast enough to allow an image to be acquired for each consecutive facet, the configuration of the area array depending upon the configuration and velocity of the scanning element.

It is, therefore, apparent that there has been provided in accordance with the present invention, a fast scan error measuring system for raster output scanners that fully satisfies the aims and advantages hereinbefore set forth. While this invention has been described in conjunction with a specific embodiment thereof, it is evident that many alternatives, modifications, and variations will be apparent to those skilled in the art. Accordingly, it is intended to embrace all such alternatives, modifications and variations that fall within the spirit and broad scope of the appended claims.

We claim:

1. An apparatus for measuring fast scan error of a scanning beam of a raster output scanner, comprising:

a single laser source which forms a single laser beam;

a light modulator which modulates the single laser beam to produce a single modulated laser beam;

a light reflecting element formed of facets which rotates, each rotating facet reflecting the single modulated laser beam to form a single reflected laser beam which produces a scan line with a start of scan line position and an end of scan line position;

a detector located at the end of scan line position which records the position of the single reflected laser beam, the single reflected laser beam forming a single beam spot on the detector;

a detector control which operationally controls the detector so that the detector records the position of the single beam spot; and a computer which calculates a Fourier transform of multiple single beam spot positions to produce a frequency spectrum of the raster output scanner.

2. The apparatus of claim 1, wherein the detector is a line scan camera.

3. The apparatus of claim 1, wherein the detector is an area array camera.

4. The apparatus of claim 1, wherein the light beam spot is formed for each consecutive rotating facet.

5. The apparatus of claim 1, wherein the light reflecting element is rotated at an operational speed of the ROS.

6. The apparatus of claim 1, wherein the start of scan position is fixed.

7. The apparatus of claim 6, wherein the detector control uses the start of scan signal to trigger the detector.

8. The apparatus of claim 1, wherein the plurality of beam spot positions is gathered from a number of consecutive scan lines sufficient for statistical purposes.

9. The apparatus of claim 1, wherein the calculation of the Fourier transform of multiple single beam spot positions is based solely on the detector recordings.

10. A method for measuring fast scan error of a scanning beam of a raster output scanner, comprising:

forming a single laser beam with a laser source;

modulating the single laser beam with a light modulator;

reflecting the single modulated laser beam with a light reflecting element formed of facets which rotates, each rotating facet reflecting the single modulated laser beam to form a single reflected laser beam, which produces a scan line having a start of scan line position and an end of scan line position;

detecting the position of the single reflected laser beam with a detector positioned at the end of scan position, the single reflected laser beam forming a single beam spot on the detector for each scan line;

controlling the detector so that the detector records the position of the single beam spot; and calculating a Fourier transform of multiple single beam spot positions formed by multiple scans to produce a frequency spectrum of the raster output scanner.

11. The method of claim 10, wherein detecting the position of the reflected laser beam includes using a line scan camera.

12. The method of claim 10, wherein detecting the position of the reflected laser beam includes using an area array camera.

13. The apparatus of claim 10, wherein detecting the position of the reflected laser beam includes detecting the light beam spot for each consecutive rotating facet.

14. The method of claim 13, wherein the light reflecting element is rotated at an operational speed of a raster output scanner.

15. The method of claim 10, further comprising:

fixing the position of the start of scan position.

16. The method of claim 15, further comprising:

triggering the detector control with the start of scan signal.

17. The method of claim 10, wherein calculating the Fourier transform of multiple single beam spot positions is based solely on the detector recordings.

18. A method for measuring fast scan error of a scanning beam of a raster output scanner, comprising:

forming a single laser beam with a single laser source;

modulating the laser beam with a light modulator;

reflecting the single modulated laser beam with a light reflecting element formed of facets which rotates, each rotating facet reflecting the single modulated laser beam to form a scan line with a start of scan line position and an end of scan line position fixing the position of the start of scan position;

detecting the position of the single reflected laser beam with a detector positioned at the end of scan position, the light reflecting element and the single modulated laser beam forming a single beam spot on the detector;

controlling the detector by triggering the detector control with the start of scan signal so that the detector records the position of the single beam spot; and calculating a Fourier transform of multiple single beam spot positions to produce a frequency spectrum of the raster output scanner expressed in cycles per a measurement of distance.

19. The method of claim of claim 18, wherein rotating the light reflecting element is at an operational speed of the raster output scanner.

20. The method of claim 18, wherein lower frequencies in the frequency spectrum indicate Hunting error due to speed control of the light reflecting element and the higher frequencies in the frequency spectrum indicate jitter error due to optical defects in the light reflecting element.

* * * * *